United States Patent
Lee et al.

(10) Patent No.: US 8,120,864 B2
(45) Date of Patent: Feb. 21, 2012

(54) DISPLAY FILTER, DISPLAY DEVICE AND METHOD FOR FORMING DISPLAY FILTER

(75) Inventors: Seoungwon Lee, Daejeon (KR); Kangyoon Kim, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/023,859

(22) Filed: Jan. 31, 2008

(65) Prior Publication Data

US 2008/0252963 A1    Oct. 16, 2008

(30) Foreign Application Priority Data

Mar. 30, 2007   (KR) .................. 10-2007-0031266

(51) Int. Cl.
*G02B 5/22* (2006.01)
*G02B 27/00* (2006.01)

(52) U.S. Cl. ........................ 359/885; 359/614

(58) Field of Classification Search .............. 359/885
See application file for complete search history.

(56) References Cited

U.S. PATENT DOCUMENTS

| 7,050,219 | B2 | 5/2006 | Kimura |
| 7,456,557 | B2 * | 11/2008 | Park et al. ............. 313/112 |
| 7,710,035 | B2 * | 5/2010 | Ryu et al. .............. 313/582 |
| 7,719,188 | B2 * | 5/2010 | Ryu et al. .............. 313/582 |
| 7,755,263 | B2 * | 7/2010 | Park et al. ............. 313/112 |
| 2005/0018272 | A1 | 1/2005 | Kimura |
| 2006/0066939 | A1 | 3/2006 | Kimura |
| 2007/0075641 | A1 * | 4/2007 | Yu ....................... 313/587 |

FOREIGN PATENT DOCUMENTS

| JP | 8-254718 A | 10/1996 |
| JP | 2000352608 A * | 12/2000 |
| JP | 2003-29170 A | 1/2003 |
| JP | 2006-201577 A | 8/2006 |
| KR | 100579713 B1 * | 8/2006 |
| KR | 10-2006-0120527 A | 11/2006 |

* cited by examiner

*Primary Examiner* — Jade R Chwasz
(74) *Attorney, Agent, or Firm* — Birch, Stewart, Kolasch & Birch, LLP

(57) ABSTRACT

A display filter including a base portion having a recess, a first part disposed in the recess and having a first refractive index different from a refractive index of the base portion, and a second part disposed in the recess and having a second refractive index different from at least one of the first refractive index of the first part and the refractive index of the base portion.

19 Claims, 12 Drawing Sheets

DISPLAY FILTER, DISPLAY DEVICE AND METHOD FOR FORMING DISPLAY FILTER

This application claims the benefit of Korean Patent Application No. 10-2007-0031266 filed on Mar. 30, 2007 which is hereby incorporated by reference.

BACKGROUND OF THE DISCLOSURE

1. Field of the Disclosure

This document relates to a display filter, a display device and a method for forming a display filter.

2. Description of the Related Art

A display device comprises a display panel for displaying an image and a display filter.

The display panel serves to display a predetermined image on a screen. As for the display panel, there are provided a liquid crystal display (LCD), a field emission display (FED), an organic light emitting device, a plasma display panel (PDP) and so on.

The display filter is disposed on the front surface of the display panel and can block an electromagnetic wave discharged from the display panel or near infrared rays (NIR).

SUMMARY OF THE DISCLOSURE

An aspect of this document is to provide a display filter, comprising a base portion having a recess, a first part disposed in the recess and having a first refractive index different from a refractive index of the base portion, and a second part disposed in the recess and having a second refractive index different from at least one of the first refractive index of the first part and the refractive index of the base portion.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention. In the drawings.

DETAILED DESCRIPTION OF EMBODIMENTS

Hereinafter, an implementation of this document will be described in detail with reference to the attached drawings.

Figure 1:
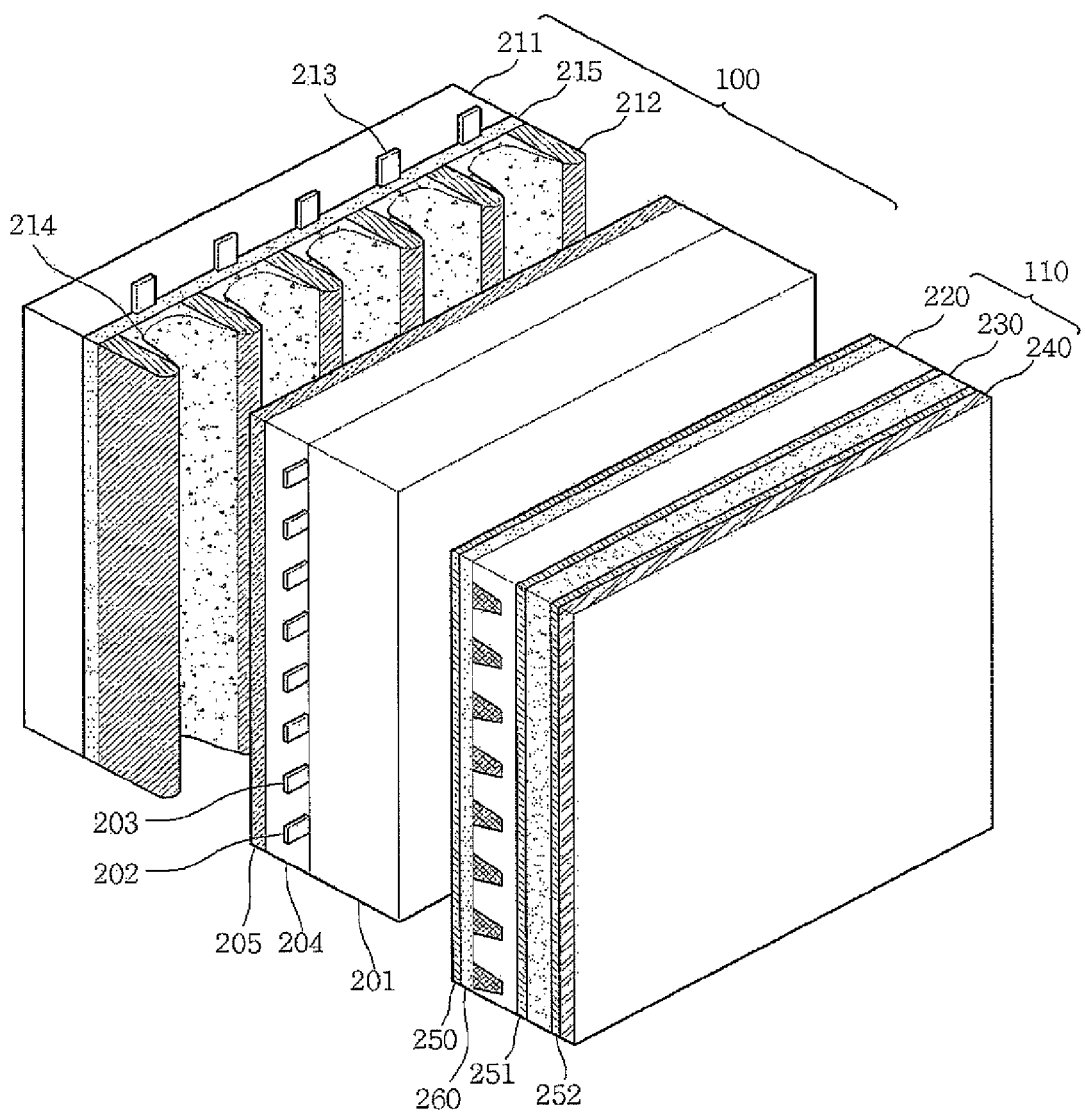
FIG. 1 is a diagram for explaining a display device according to an exemplary embodiment of the present invention.

FIG. 1 is a diagram for explaining a display device according to an exemplary embodiment of the present invention. In the following descriptions, a PDP will be exemplified as a display panel. However, a display panel according to the present invention is not limited to a PDP, but may be an LCD, an FED, or an OLED.

Referring to FIG. 1, a display device according to an exemplary embodiment of the present invention comprises a PDP 100 for displaying an image and a display filter 110.

The PDP 100 serves to display a predetermined image on a screen, and the display filter 110 is disposed on the front surface of the display panel 100.

The PDP 100 comprises a front substrate 201, in which a scan electrode (Y) 202 and a sustain electrode (z) 203 are disposed in parallel to each other, and a rear substrate 211 which is disposed so as to oppose the front substrate 201 and in which an address electrode 213 crossing the scan electrode 202 and the sustain electrode 203 is disposed. The front and rear substrates 201 and 211 may be bonded to each other.

On the front substrate 201 in which the scan electrode 202 and the sustain electrode 203 are disposed, an upper dielectric layer 204 may be disposed so as to cover the scan electrode 202 and the sustain electrode 203.

The upper dielectric layer 204 can limit discharge currents of the scan electrode 202 and the sustain electrode 203 and insulate the scan electrode 202 from the sustain electrode 203.

On the upper dielectric layer 204, a protective layer 205 may be disposed, which facilitates a discharge condition. The protective layer 205 may be formed of a material of which the secondary electron emission coefficient is high, that is, MgO or the like.

In the rear substrate 211, an electrode, for example, the address electrode 213 is disposed. On the rear substrate 211 in which the address electrode 213 is disposed, a dielectric layer, for example, a lower dielectric layer 215 may be disposed, which can cover the address electrode 213 and insulate the address electrode 213.

Between the front substrate 201 and the rear substrate 211, a barrier rib 212 for portioning discharge spaces, that is, discharge cells may be disposed. The barrier rib 212 is formed in a stripe type, a well type, a delta type or the like. Between the front substrate 201 and the rear substrate 211, red (R), green (G), and blue (B) discharge cells may be provided by the barrier rib 212.

For example, a closed-type barrier rib structure may comprise first and second barrier ribs (not shown) crossing each other. Further, the height of the first barrier rib may differ from that of the second barrier rib.

In the discharge cells partitioned by the barrier rib 212, predetermined discharge gas is filled. Further, in each of the discharge cells partitioned by the barrier rib 212, a phosphor layer 214 may be disposed, which emits visible rays for displaying an image during address discharge. For example, red (R), green (G), and blue (B) phosphor layers may be disposed.

Up to now, an example of the PDP to which the present invention can be applied has been illustrated and described. The present invention is not limited to the PDP with the above-described structure. For example, in the above description, only the case has been described, where the scan electrode 202 and the sustain electrode 203 are disposed so as to come in contact with the top surface of the front substrate 201. However, at least one functional layer, for example, another dielectric layer may be disposed between the front substrate 201 and the scan and sustain electrodes 202 and 203.

The display filter 110 may comprise a light shielding layer 200 which shields light incident from outside. Further, the display filter 110 may comprise a color layer 230 and an electromagnetic wave blocking layer 240.

Between the light shielding layer 220 and the color layer 230, a first bonding layer 251 may be formed so as to bond the light shielding layer 220 to the color layer 230. Further, between the color layer 230 and the electromagnetic wave blocking layer 240, a second bonding layer 251 may be formed so as to bond the color layer 230 to the electromagnetic wave blocking layer 240.

Reference numeral 260 represents a substrate. The substrate 260 may have a space in which the light shielding layer 220, the color layer 230, and the electromagnetic blocking layer 240 can be formed. The substrate 260 may be formed of a polymer resin material.

Reference numeral 250 represents a third bonding layer, which can be disposed to bond the display filter 110 to the PDP 100.

The display filter according to the present invention may further comprise an NIR shielding layer.

In the display filter described above, the positions of the light shielding layer 220, the color layer 230, the electromagnetic wave blocking layer 240, and the substrate 260 may be changed. For example, the electromagnetic wave blocking layer 240 may be disposed on the substrate 260, the color layer 230 may be disposed on the electromagnetic wave blocking layer 240, and the light shielding layer 220 may be disposed on the color layer 230.

Figure 2:
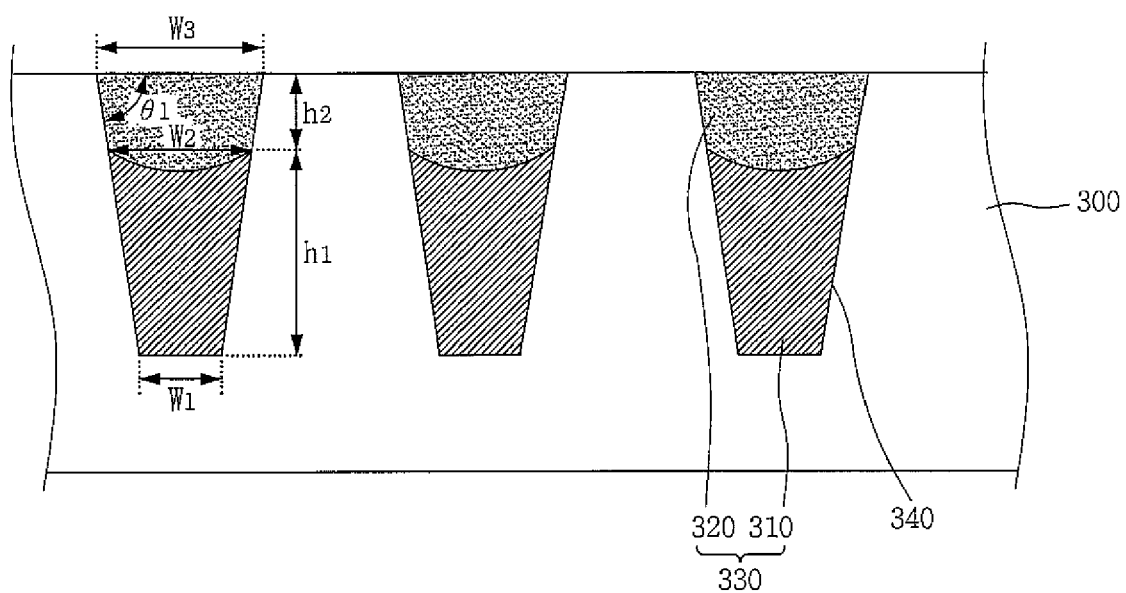
FIG. 2 is a diagram for explaining a light shielding layer of a display filter in more detail.

FIG. 2 is a diagram for explaining the light shielding layer of the display filter in more detail.

Referring to FIG. 2, the light shielding layer of the display filter according to an exemplary embodiment of the present invention comprises a base portion 300, a first part 310, and a second part 320. The display panel is disposed in a lower direction of the second part 320. That is, the second part 320 is disposed to face the display panel. The first and second parts 310 and 320 can be referred to as a dark color portion 330 as a whole.

The base portion 300 has a recess 340 which is recessed with a predetermined depth.

The first part 310 is disposed in the recess 340 of the base portion 300 and has a different refractive index from the base portion 330. The refractive index of the first part 310 is referred to as a first refractive index. And the first part may have a flat top surface.

The second part 320 is disposed in the recess 340 of the base portion 300 and has a different refractive index from at least one of the first refractive index of the first part 310 and the refractive index of the base portion 320. The refractive index of the second part 320 is referred to as a second refractive index.

The first refractive index of the first part 310 may be smaller than that of the base portion 300, and the second refractive index of the second part 320 may be greater than that of the base portion 300. On the contrary, the first refractive index of the first part 310 may be greater than that of the base portion 300, and the second refractive index of the second part 320 may be smaller than that of the base portion 300.

The first part 310 may contact the second part 320 in the recess 340. For example, the first part 310 may be disposed between the second part 320 and the base portion 300 in the recess 340. When a direction where the recess 340 is formed is assumed to be an upper direct ion in the base portion 300, the second part 320 is disposed on the first part 310 in the recess 340.

The degree of blackness of the first and second parts 310 and 320 may be greater than that of the base portion 300. That is, the colors of the first and second parts 310 and 302 are darker than that of the base portion 300.

Preferably, the base portion 300 may be substantially transparent, and the colors of the first and second parts 310 and 320 may be substantially black. For example, the first and second parts 310 and 320 may comprise carbon or the like, and thus may have substantially a black color. Further, the base portion 300 may be formed of ultraviolet curing resin.

Desirably the degree of blackness of the first part 310 is less than the degree of blackness of the second part 320.

The height h2 of the second part 320 may differ from the height h1 of the first part 310. For example, when the height h2 of the second part 320 is referred to as a second height and the height h1 of the first part 310 is referred to as a first height, the second height h2 may be smaller than the first height h1.

At least one of the heights h1 and h2 of the first and second parts 310 and 320 may be an average height. Alternately, at least one of the heights h1 and h2 of the first and second parts 310 and 320 may be the maximum height.

When the lower width of the first part 310 is represented by A and the lower width of the second part 320 is represented by B, the height h1 of the first part 310 may be a height at a position of A/2, and the height h2 of the second part 320 may be a height at a position of B/2.

Preferably, the cross-sectional shape of the dark color portion 330 comprising the first and second parts 310 and 320 is a wedge shape. For example, the minimum width of the first part 310 of the dark color portion 330 may be represented by W1, the maximum width thereof may be represented by W2, the minimum width of the second part 320 may be represented by W2, and the maximum width thereof may be represented by W3. In this case, a relationship of W1<W2<W3 can be established.

Therefore, the width of the first part 310 may be smaller than or equal to the average width of the second part 320. Therefore, the width of the dark color portion 330 may gradually decrease toward the direction of the base portion 300.

Then, the side surface of the dark color portion 330 and the base surface of the base portion 300 form a predetermined angle θ1. The angle θ1 can be set in the range of 70 to 90 degrees such that light incident from outside is absorbed and light generated inside is discharged.

Figure 3A:
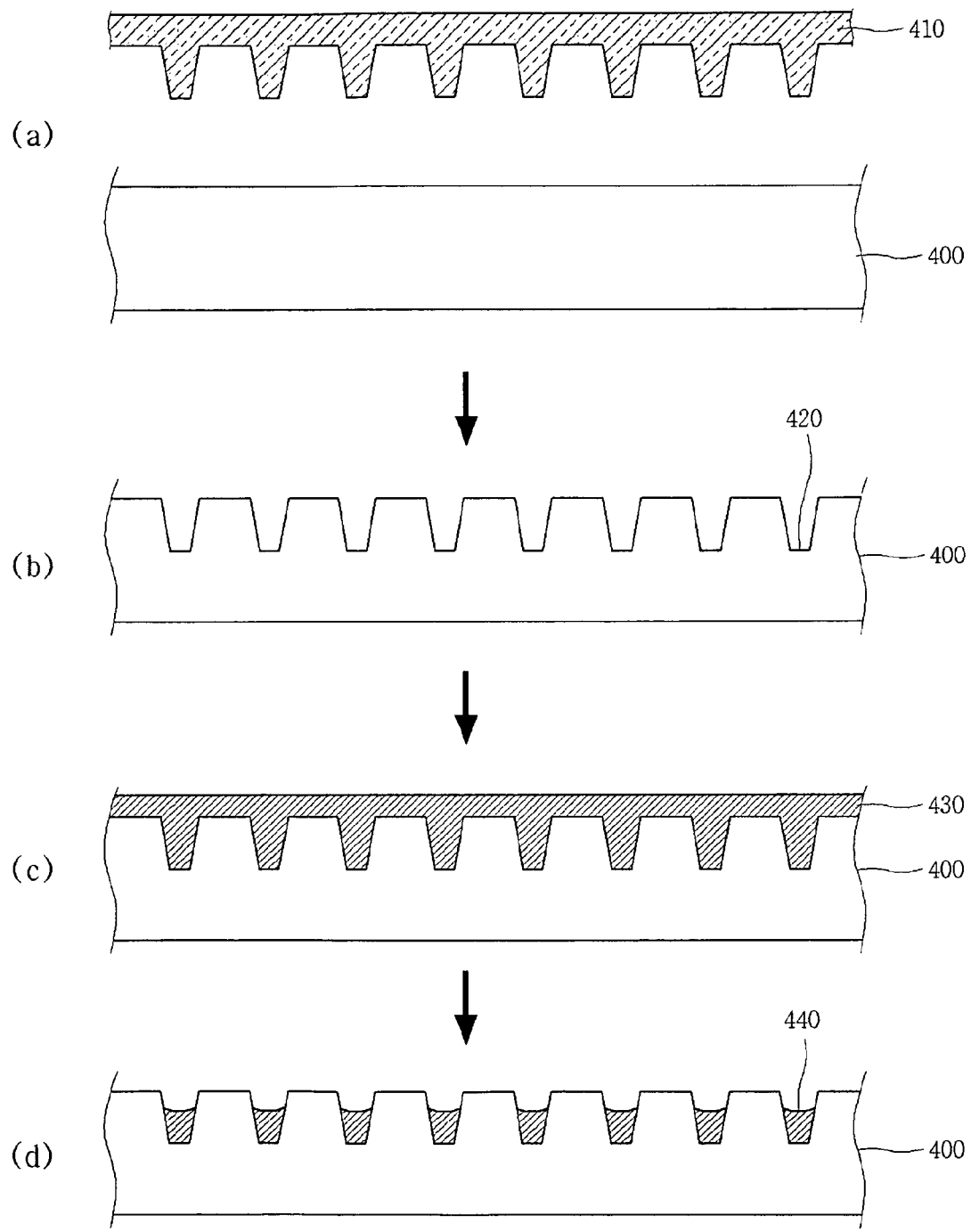
FIGS. 3A and 3B are diagrams for explaining a method of manufacturing a display filter.
Figure 3B:
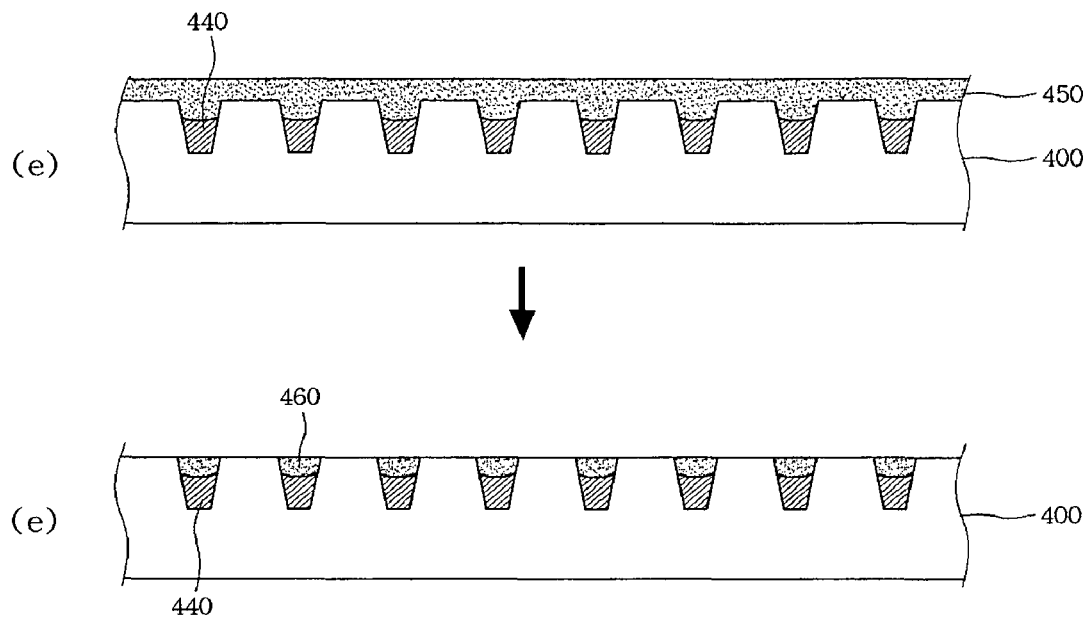

FIGS. 3A and 3B are diagrams for explaining a method of manufacturing a display filter. The present invention is not limited to the manufacturing method illustrated in FIGS. 3A and 3B.

Referring to FIG. 3A, a base portion 400 is prepared, and a mold 410 having a predetermine pattern is disposed on the base portion 400. Further, pressure is applied to the mold 410 such that the pattern of the mold 40 is formed in the upper portion of the base portion 400 (step (a)).

Then, a plurality of recesses 420 which are recessed with a predetermined depth are formed in the base portion 400 (step (b)).

After that, a first material 430 with fluidity is coated on the base portion 400 having the recesses 420 formed therein (step (c)). Then, the first material 430 may be filled in the recesses 420 of the base port ion 400. The first material 430 is referred to as the first resin which may have carbon particles. Then, the first resin 430 is removed from the surface of the base portion 400. For examples the surface of the base portion 400 having the first resin 430 therein is scraped so as to form the first part 440 in the recess 420 of the base portion 400. Accordingly, a plurality of first parts 440 may be formed in the base portion 400 (step (d)). That is, the recesses 420 recessed with a predetermined depth are provided in the base portion 400, and the first parts 440 are formed in the respective recesses 420 of the base portion 400. Referring to FIG. 5B, after the first parts 440 are formed in the recesses 420, a second material 450 with fluidity is coated on the base portion 400 having the first parts 440 formed therein (step (e)). Then, the second material 450 may be filled in the upper side of the first part 440 in each of the recesses 420 of the base portion 400. The second material 450 is referred to as the second resin which may have carbon particles. After that, the second resin 450 is removed from the surface of the base portion 400. For example, the surface of the base portion 400 having the second resin 450 therein is scraped so as to form the second part 460 on the first part 440 in the recess 420 of the base portion 400. Accordingly, the second part 460 may be formed on the first part in the recess 420 of the base portion 400. That is, the recess 420 recessed with a predetermined depth is provided in the base portion 400, the first part 440 is formed in the recess 420 of the base portion 400, and the second part 460 is formed in contact with the first part 440 in the recess 420.

In step (c) of FIG. 3A and step (e) of FIG. 3B, the first and second resin 430 and 450 can be removed from the base portion 400 by using the same equipment or different equipments.

Figure 4:
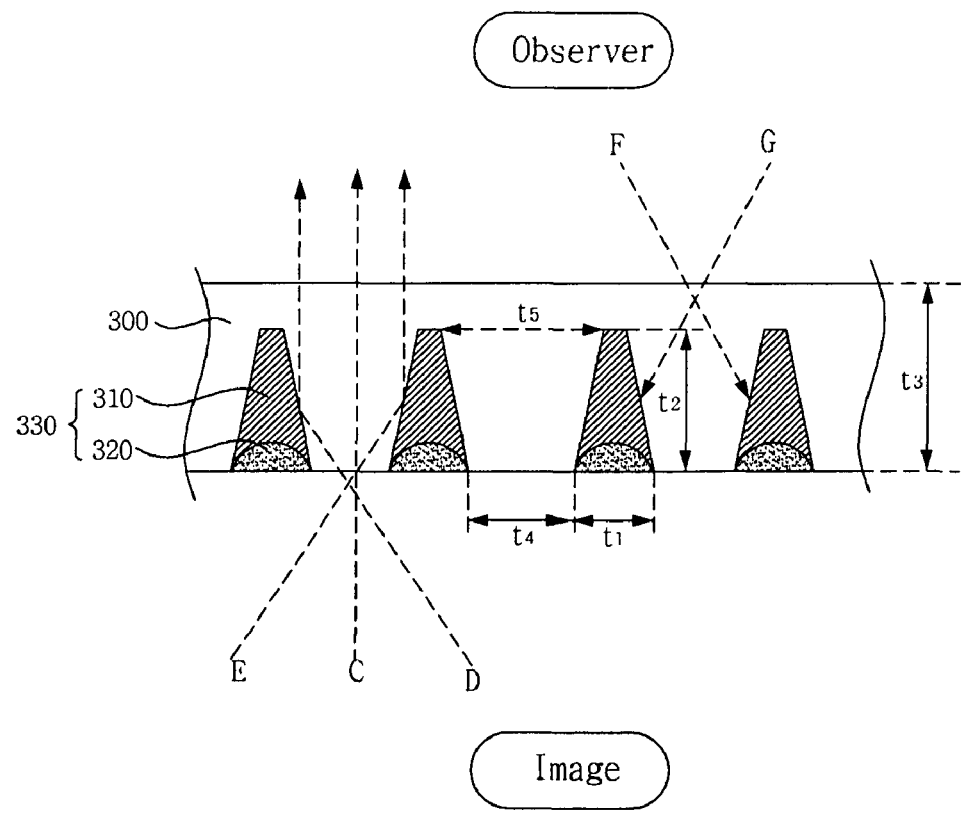
FIG. 4 is a diagram for explaining an example of the function of a dark color portion comprising first and second parts.

FIG. 4 is a diagram for explaining an example of the function of the dark color portion comprising the first and second parts.

Referring to FIG. 4, light propagating along a path C can be directly discharged to the outside of the display filter, and light propagating along a path D or E is totally reflected by the first part 310 of the dark color portion 330 so as to be discharged to the outside. Such a phenomenon occurs because the refractive index of the first part 310 of the dark color portion 310 is smaller than that of the base portion 300, and the side surface of the first part 310 of the dark color portion 310 forms a predetermined angle θ1 with the base surface of the base portion 300. The respective lights propagating along the paths C, D, and E may be lights generated from a side where an image is displayed, that is, where the display panel is disposed.

On the contrary, light propagating along a path F or G can be absorbed by at least one of the first and second parts 310 and 320 of the dark color portion 330. This is because the degree of blackness of the first and second parts 310 and 320 is higher than that of the base portion 300. The light propagating along a path F or G may be light incident from an observer side.

As such, light generated inside the display filter is effectively discharged to the outside, and light incident from the outside of the display filter is absorbed. Therefore, a contract characteristic of an image displayed on a screen of the display panel can be enhanced.

In order to effectively absorb light incident from the outside of the display filter and to effectively discharge light generated inside the display filter, the first refractive index of the first part 310 may be set to be approximately 0.82 times greater and approximately 0.99 times less than the refractive index of the base portion 300.

Further, the height t3 of the base portion 300 can be set to be approximately 1.01 times greater and approximately 2.25 times less than the height t2 of the dark color portion 310.

In this structure, a production yield on a manufacturing process can be enhanced, and the solidity of the display filter can be sufficiently secured. Further, light incident from the outside of the display filter can be sufficiently blocked, and the transmittance of light discharged inside the display filter can be sufficiently secured.

Further, a distance t4 between the lower portions of the dark color portions 330 can be set to be approximately 1.1 times greater and approximately 5 times less than the lower width t1 of the dark color portion 330. In this structure, an aperture ratio of the display filter can be sufficiently secured. Further, light incident from the outside of the display filter can be sufficiently blocked, and the manufacturing process of the dark color portion 330 can be facilitated.

Further, a distance t5 between the upper portions of the dark color portions 330 can be set to be approximately 1.1 times greater and approximately 3.25 times less than the distance t4 between the lower portions of the dark color portions 330. In this structure, the aperture ratio of the display filter can be sufficiently secured, and the angle θ1 of the dark color portion 330 can be optimized. Therefore, it is possible to sufficiently block light incident from the outside of the display filter.

The height t2 of the dark color portion 330 can be set to be approximately 0.89 times greater and approximately 4.25 time less than the distance t4 between the lower portions of the dark color portion 330. In this case, the aperture ratio of the display filter can be sufficiently secured, and light incident from the outside of the display filter can be sufficiently blocked.

For example, the lower width t1 of the dark color portion 330 can be set in the range of 18 to 35 μm.

The height t2 of the dark color portion 330 can be set in the range of 80 to 170 μm.

The height t3 of the base portion 300 can be set in the range of 100 to 180 μm.

The distance t4 between the lower portions of the dark color portions 330 can be set in the range of 40 to 90 μm.

The distance t5 between the upper portions of the dark color portions 330 can be set in the range of 90 to 130 μm.

Figure 5A:
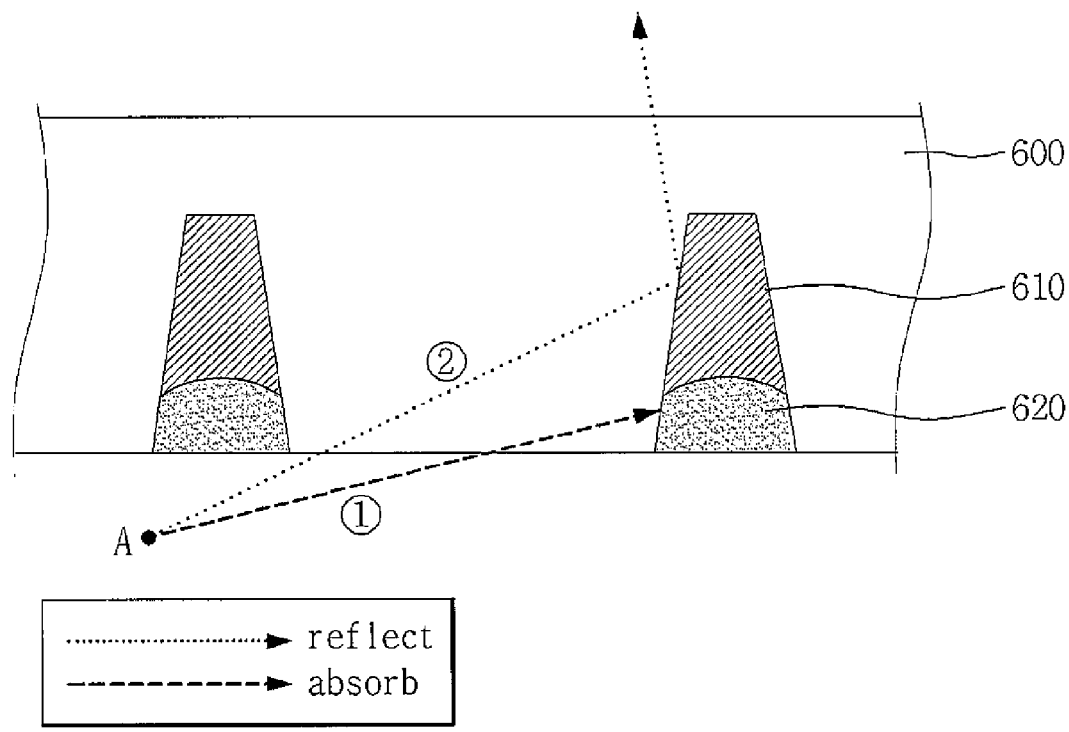
FIGS. 5A to 5C are diagrams for explaining an example of the function of the second part.
Figure 5B:
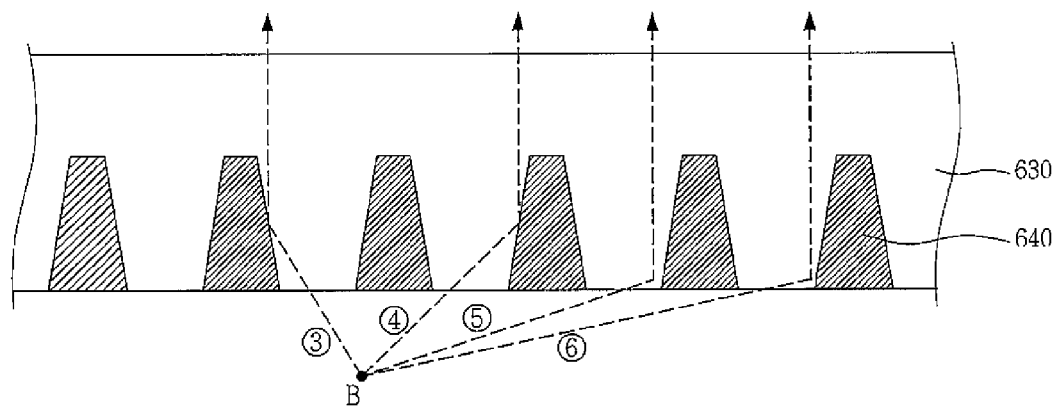
Figure 5C:
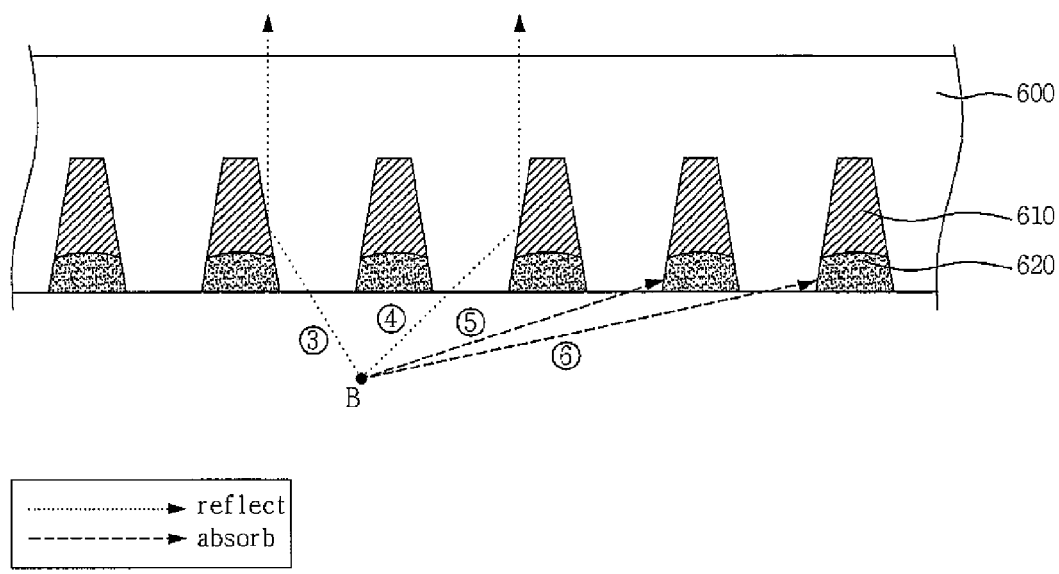

FIGS. 5A to 5C are diagrams for explaining an example of the function of the second part.

Referring to FIG. 5A, when light generated at a spot A propagates along a path 2, the light is reflected by the first part 610 provided in the base portion 600 so as to be discharged to the outside. On the contrary, most of light propagating along a path 1 is absorbed by the second part 620. That is, light discharged from the lower direction of the display filter is reflected by the first part 610, but is absorbed by the second part 620.

In this case, it is preferable that the first refractive index of the first part 610 is less than that of the base portion 600, and the second refractive index of the second part 620 is greater than that of the base portion 600. In FIG. 5A, the light absorption path is represented by a thick solid line, and the light reflection path is represented by a thin dashed line.

In order to enhance the light reflection efficiency of the first part 610, it is preferable that the first refractive index of the first part 610 is approximately 0.82 times greater and approximately 0.99 times less than that of the base portion 600.

In order to enhance the light absorption efficiency of the second part 620, it is preferable that the refractive index of the base portion 600 is approximately 0.82 times greater and approximately 0.99 times less than the second refractive index of the second part 620.

FIG. 5B illustrates a case where the display filter does not comprise the second part.

In this case, when light generated at a spot B propagates along a path 3 or 4, the light can be reflected by the dark color portion 640 disposed adjacent to the spot B so as to be discharged to the outside.

On the contrary, light propagating along a path 5 or 6 can be reflected by the dark color portion 640 which is relatively distant from the spot B where the light is generated. Then, the light can be discharged to the outside. The light propagating along the path 5 or 6 causes a visual effect in which an accurate position of an image displayed on a screen is confused. This effect is called as a ghost effect. Such a ghost effect may degrade an image quality.

On the contrary, referring to FIG. 5C, light propagating along a path 5 or 6 is not reflected any more, but is absorbed by the second part 620. Accordingly, the ghost effect described in FIG. 5B is prevented from occurring.

In FIG. 5C, the light absorption path is represented by a thick solid line, and the light reflection path is represented by a thin dashed line.

Considering the contents of FIGS. 5A to 5C, it can be found that, when the first and second parts 610 and 620 are formed adjacent to each other in the recess formed in the base portion 600, the ghost effect is weakened so that an image quality can be improved.

Referring to Table 1, the relationship between the heights of the first and second parts will be described.

TABLE 1

| $h_1/h_2$ | Ghost effect | Luminance |
|---|---|---|
| 0.04 | X | ◉ |
| 0.05 | ○ | ◉ |
| 0.06 | ○ | ◉ |
| 0.07 | ○ | ◉ |
| 0.09 | ○ | ◉ |
| 0.11 | ○ | ◉ |
| 0.13 | ◉ | ◉ |
| 0.17 | ◉ | ◉ |
| 0.25 | ◉ | ◉ |
| 0.32 | ◉ | ◉ |
| 0.34 | ◉ | ◉ |
| 0.35 | ◉ | ○ |
| 0.38 | ◉ | ○ |
| 0.41 | ◉ | ○ |
| 0.45 | ◉ | ○ |
| 0.45 | ◉ | X |

In Table 1, X represents a defective case where a ghost effect occurs or the luminance of a displayed image is low, ○ represents a favorable case, and ◉ represents a very favorable case.

A test condition in Table 1 is as follows.

The height t2 of the dark color portion comprising the first and second parts is fixed to about 104 μm. At this time, while a ratio of the height of the first part to the height of the second part is varied, it is observed whether or not a ghost effect occurs on an image displayed on the screen of the display panel, and the luminance of the displayed image is measured. The height h1 of the first part is referred to as a first height, and the height h2 of the second part is referred to as a second height.

Referring to Table 1, when the second height h2 of the second part is approximately 0.04 times greater than the first height h1 of the first part, the second height h2 of the second part is much smaller than the first height h1 of the first part such that an effect of preventing the ghost effect described in FIG. 5B is insignificant. Accordingly, the ghost effect frequently occurs on the screen. Therefore, this case is defective (X).

On the contrary, when the second height h2 is approximately 0.05 times greater and approximately 0.11 times less than the first height h1, the second height h2 is so proper that the ghost effect can be prevented from occurring. In this case, an insignificant ghost effect may occur, but does not degrade an image quality. Therefore, this case is favorable (○).

Further, when the second height h2 is approximately 1.13 times greater than the first height h1, the second height h2 is optimized in terms of a ghost effect such that a ghost effect can be sufficiently prevented. Therefore, this case is very favorable (◉).

In terms of the luminance of a displayed image, when the second height h2 is approximately 0.04 times greater and approximately 0.34 times less than the first height h1, the second height h2 is sufficiently small so that the absorption of light, discharged from inside to outside, through the second part can be minimized. Accordingly, the luminance of a displayed image is very favorable (◉).

Further, when the second height h2 is approximately 0.35 times greater and approximately 0.45 times less than the first height h1, the second height h2 is proper. Accordingly, the luminance of a displayed image is favorable (○).

On the contrary, when the second height h2 is approximately 0.46 times greater than the first height h1, the second height h2 is excessively large so that most of light discharged form inside to outside can be absorbed by the second part. Accordingly, the luminance of a displayed image is defective (X).

Considering the contents of Table 1, it is preferable that the second height h2 is approximately 0.05 times greater and approximately 0.45 times less than the first height h1. More preferably, the second height h2 is approximately 0.13 times greater and approximately 0.34 times less than the first height h1.

FIGS. 6A to 6E are diagrams for explaining other examples of the first and second parts.

Figure 6A:
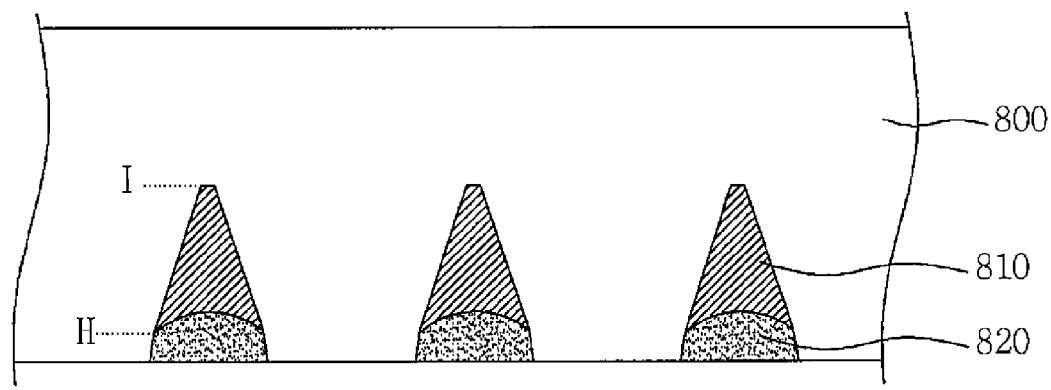
FIGS. 6A to 6E are diagrams for explaining other examples of the first and second parts.

Referring to FIG. 6A, the width of a second part 820 may slowly decrease to a spot H, and the width of a first part 810 may relatively rapidly decrease to a spot I. Accordingly, the side of the first part 810 may form an obtuse angle with the side of the second part 820.

Figure 6B:
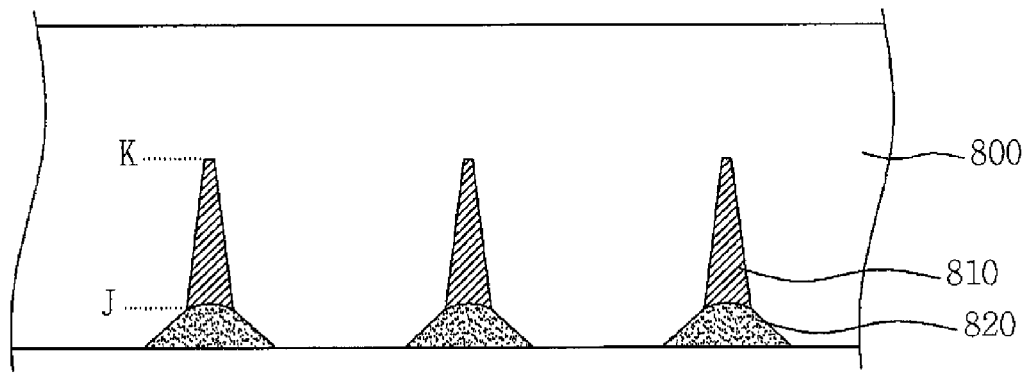

Referring to FIG. 6B, the width of a second part 820 may rapidly decrease to a spot J, and the width of a first part 810 may relatively slowly decrease to a spot K.

Figure 6C:
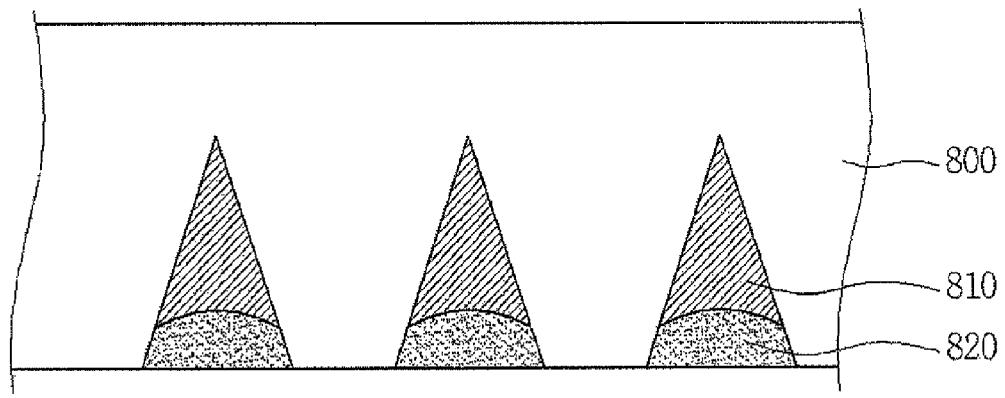

Referring to FIG. 6C, a first part 810 may be formed in a triangle, of which the end is sharp. Accordingly, the first part may have a pointy top, and the sides of the first 810 and second parts 820 may form a slanted straight line.

Figure 6D:
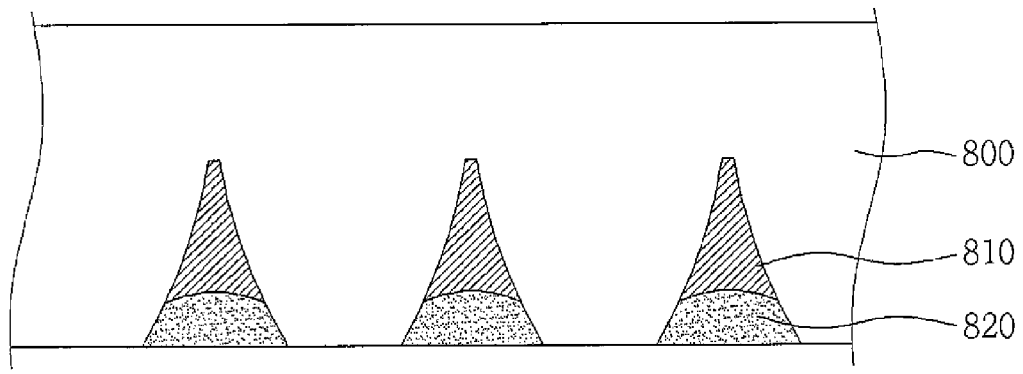

Referring to FIG. 6D, the side surfaces of first and second parts 810 and 820 may be formed in a slowly curved line. Accordingly, the sides of the first 810 and second parts 820 may form a slanted curved line.

Figure 6E:
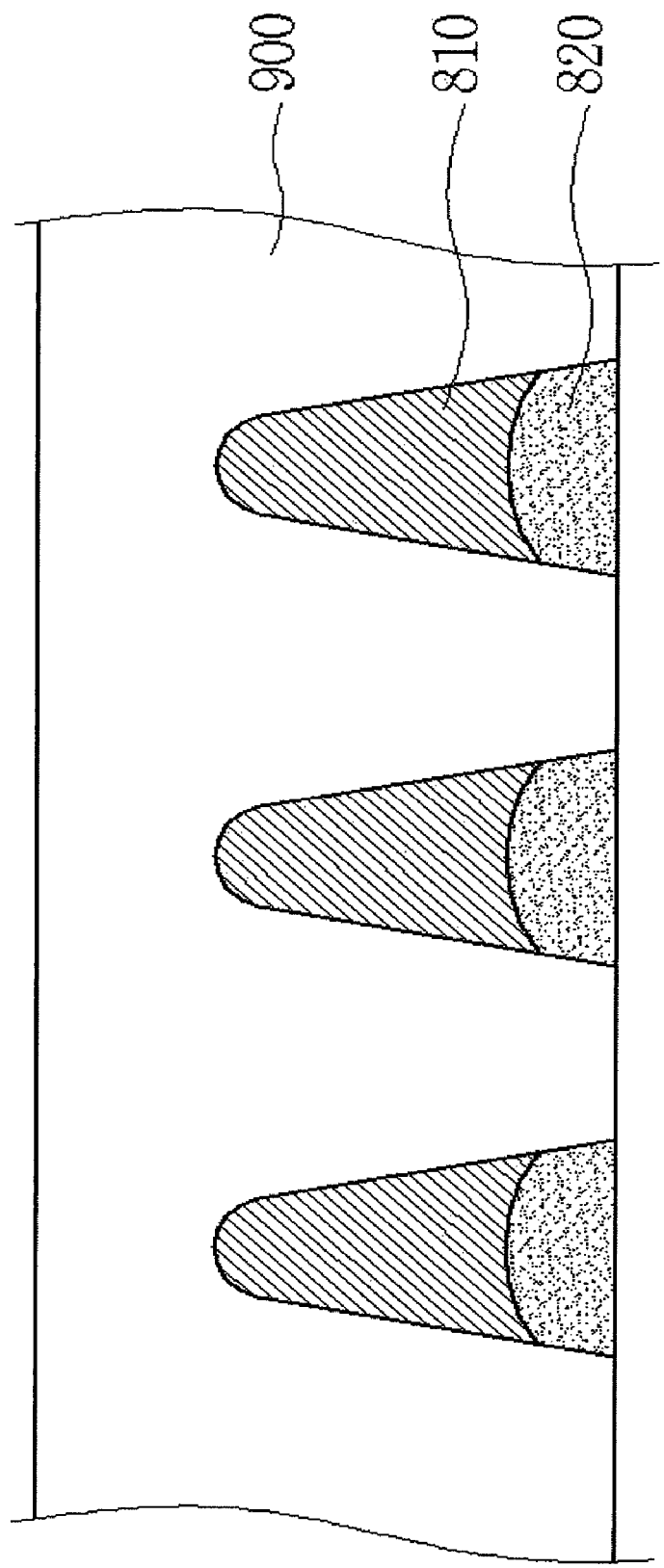

Referring to FIG. 6E, the first part 810 may have a curved top surface.

The shapes of the first and second parts 810 and 820 are not limited to those illustrated in FIGS. 6A to 6E. In addition to the shapes illustrated in FIGS. 6A to 6E, if light incident from outside can be blocked and light generated inside the display panel can be discharged to the outside, the first and second parts 810 and 820 may be formed in any shape. For the blocking efficiency of external light and the discharge efficiency of internal light, it is preferable that the cross-sectional shape of the dark color portion 910 is a wedge shape.

As described above, the shapes of the first and second parts may be changed in various manners.

Figure 7A:
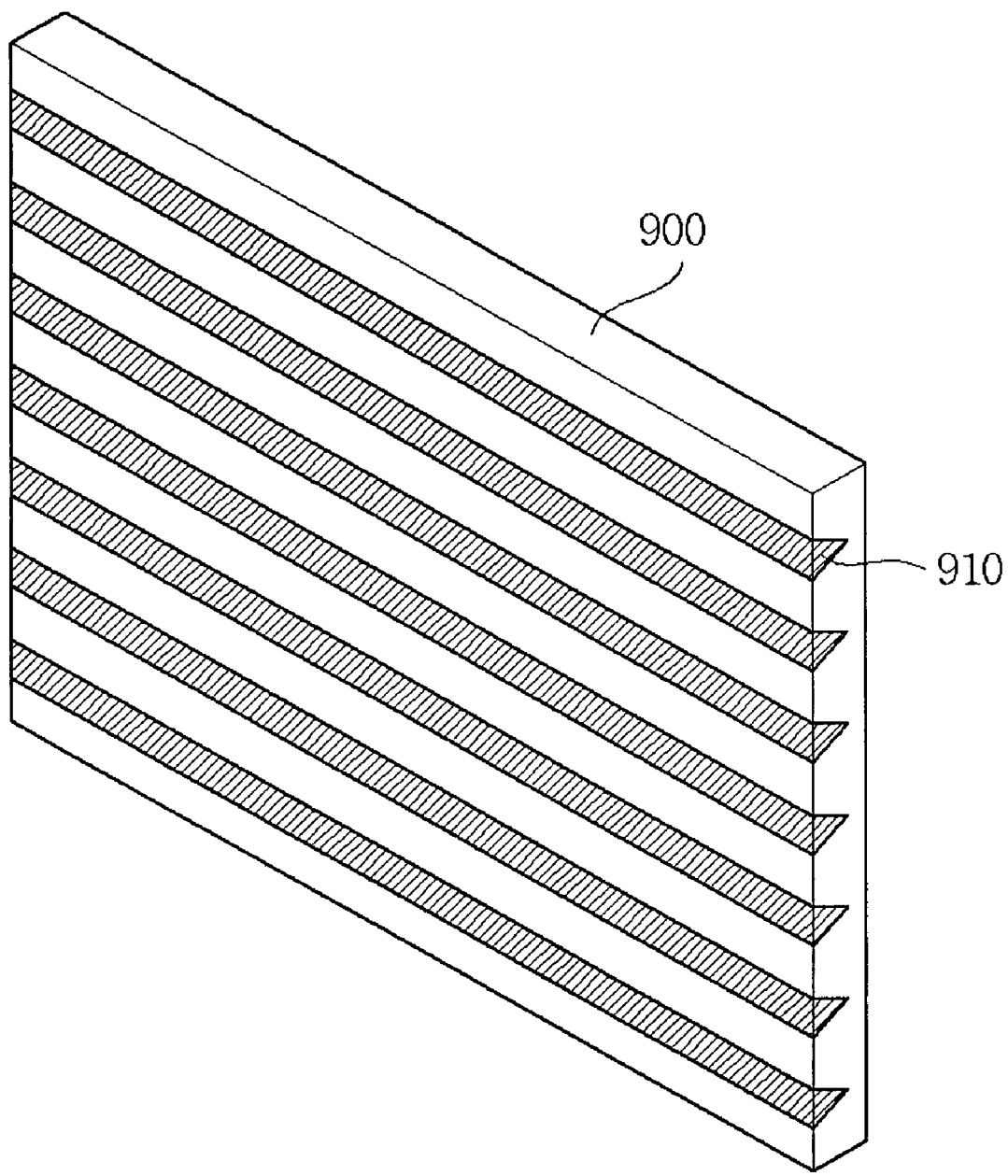
FIGS. 7A and 7B are diagrams for explaining a formation direction of the dark color portion comprising the first and second parts.
Figure 7B:
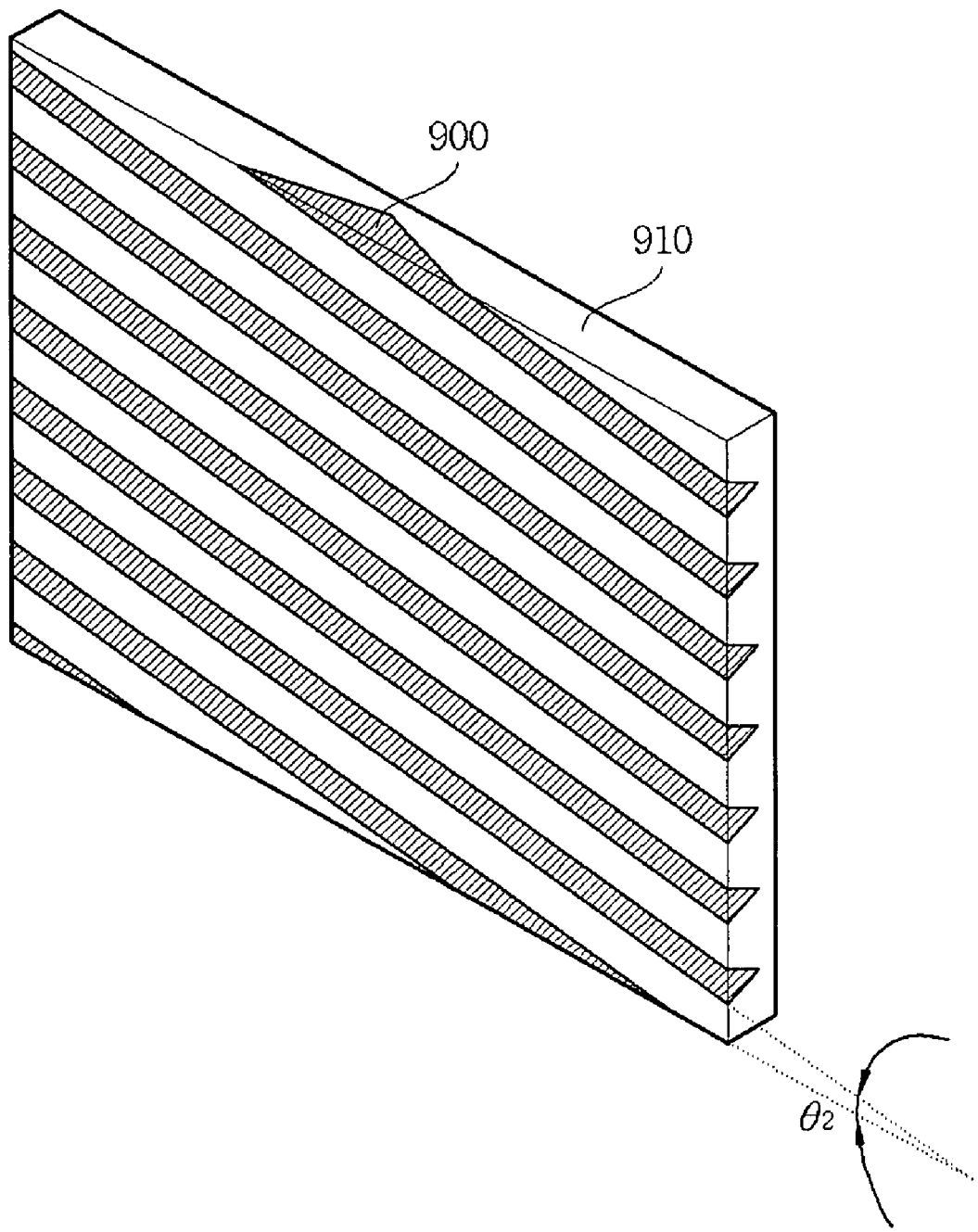

FIGS. 7A and 7B are diagrams for explaining a formation direction of the dark color portion comprising the first and second parts. In FIGS. 7A and 7B, the first and second parts are not discriminated, and are illustrated as one dark color portion.

Referring to FIG. 7A, the formation direction of a dark color portion 910 may be substantially aligned with the long side of the base portion 900.

Referring to FIG. 71, the formation direction of a dark color portion 910 may form a predetermined angle θ2 with the long side of the base portion 900.

As such, when the formation direction of the dark color portion 910 forms a predetermined angle θ2 with the long side of the base portion 900, an interference fringe generated when more than two periodic patterns are overlapped, that is, a Moire fringe can be prevented.

To more effectively prevent such a Moire fringe, a predetermined angle θ2 between the formation direction of the dark color portion 920 and the long side of the base portion 910 may be set in the range of 5 to 80 degrees.

In the above descriptions, only the stripe-type dark color portion has been illustrated and described. The type of the dark color portion may be changed in various manners.

Figure 8A:
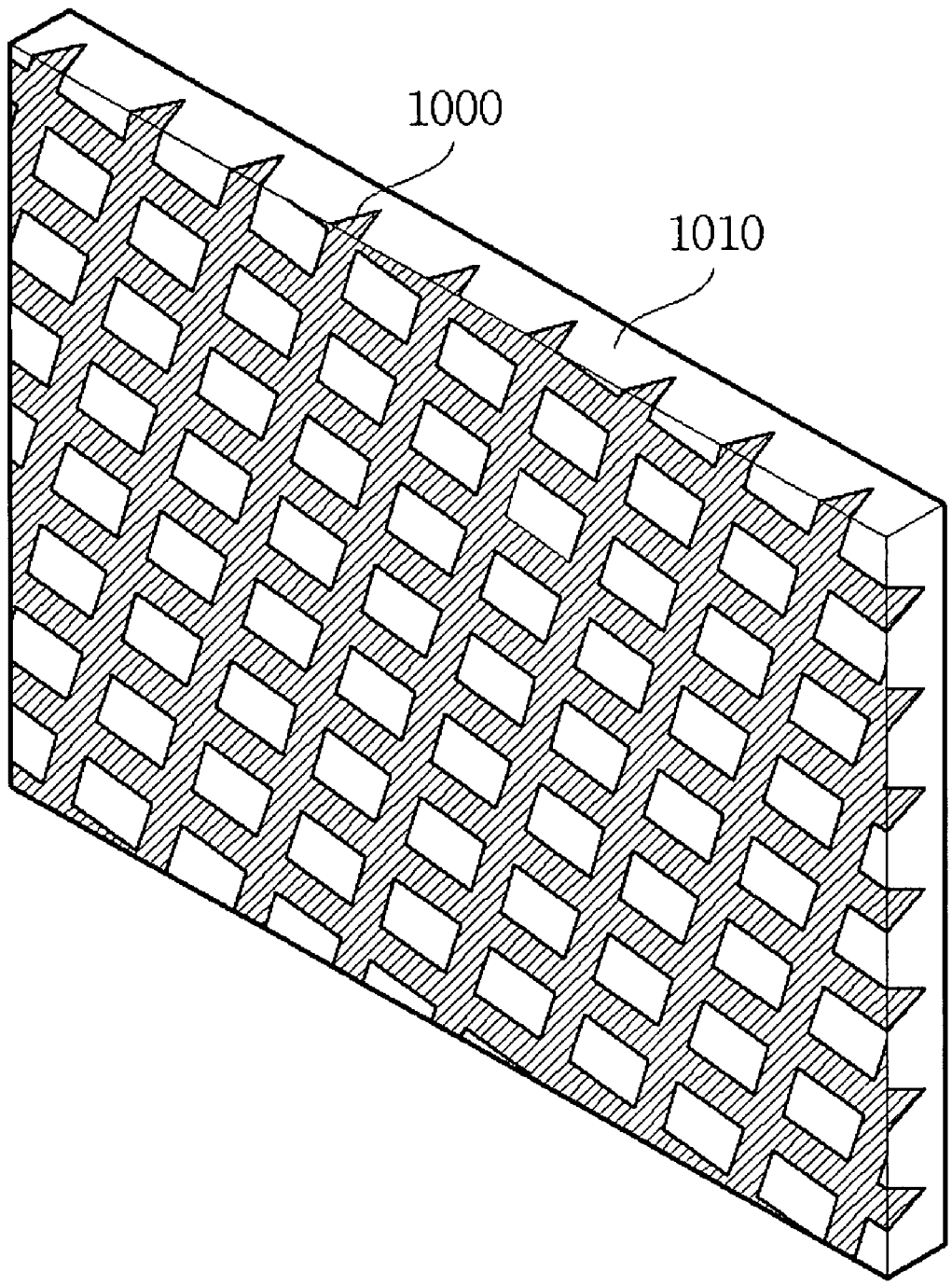
FIGS. 8A and 8B are diagrams for explaining various types of dark color portions.
Figure 8B:
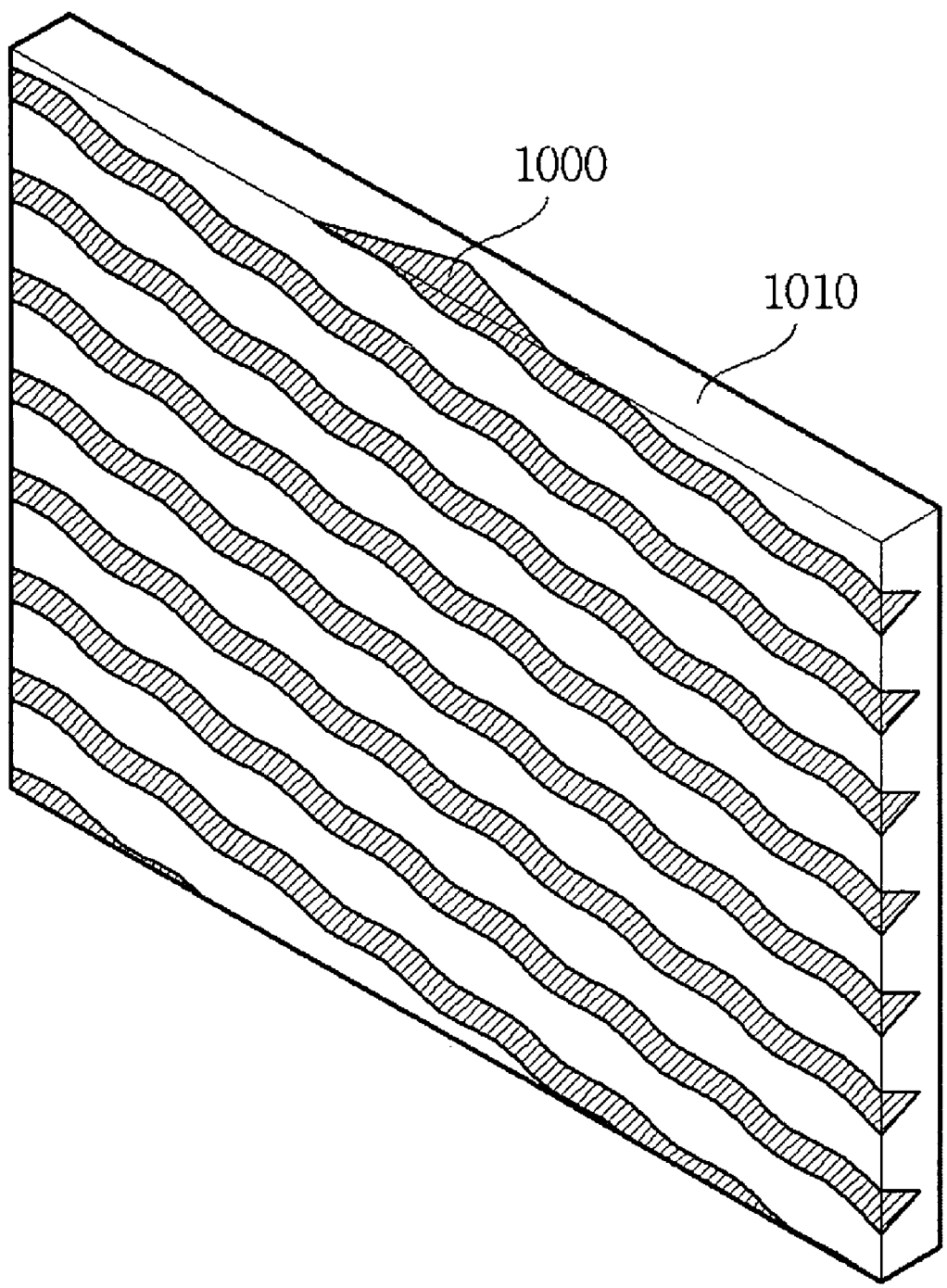

FIGS. 8A and 8B are diagrams for explaining various types of the dark color portion. In FIGS. 8A and 8B, the first and second parts are not discriminated, and are illustrated as one dark color portion.

Referring to FIG. 8A, a dark color portion 1000 may be formed in a matrix type.

Referring to FIG. 8B, a dark color portion 1020 may be formed in a wave type.

As described above, the type of the dark color portion may be changed in various manners.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A display filter disposed on a front surface of a display panel, comprising:
   a base portion including a first surface facing the front surface of the display panel and a second surface opposing the first surface, wherein a recess is formed on the first surface;
   a first part disposed in the recess and having a first refractive index less than a refractive index of the base portion, the first part having side surfaces contacting the base portion; and
   a second part disposed in the recess and having a second refractive index greater than the refractive index of the base portion, the second part having side surfaces contacting the base portion,
   wherein a vertical distance between the first surface and the display panel is less than a vertical distance between the second surface and the display panel,
   wherein a width of the recess is gradually decreased toward the direction of the second surface of the base portion, and a distance between the second part and the display panel is less than a distance between the first part and the display panel,
   wherein light discharged from the lower direction of the display filter is incident on the side surfaces of the first or second parts,
   wherein the light incident on the side surfaces of first part is reflected by the side surfaces of the first part and then discharged to the second surface of the base portion, and the light incident on the side surfaces of the second part is absorbed by the side surfaces of the second part, and
   wherein a height of the side surfaces of the second part is 0.05 times greater and 0.45 times less than a height of the side surfaces of the first part.

2. The display filter of claim 1, wherein the first part is disposed in contact with the second part in the recess.

3. The display filter of claim 1, wherein the first refractive index is 0.82 times greater and 0.99 times less than the refractive index of the base portion.

4. The display filter of claim 1, wherein the refractive index of the base portion is 0.82 times greater and approximately 0.99 times less than the second refractive index.

5. The display filter of claim 1, wherein a degree of blackness of the first part is less than a degree of blackness of the second part.

6. The display filter of claim 1, wherein a width of the first part is less than a width of the second part.

7. The display filter of claim 1, wherein the first part has a flat top surface, a pointy top, or a curved top surface.

8. The display filter of claim 1, wherein the first part has a pointy top, and
   wherein the side surfaces of the first and second parts form a slanted straight line or a slanted curved line, or a side of the first part forms an obtuse angle with respect to a side of the second part.

9. The display filter of claim 1,
   wherein the first and second parts form a matrix or wavy configuration.

10. A display device, comprising
    a display panel for displaying an image; and
    a display filter disposed on a front surface of the display panel,
    wherein the display filter comprises:
      a base portion including a first surface facing the front surface of the display panel and a second surface opposing the first surface, the base portion being substantially transparent, wherein a recess is formed on the first surface;
      a first part disposed in the recess and having a first refractive index less than a refractive index of the base portion, the first part having side surfaces contacting the base portion; and
      a second part disposed in the recess, facing the display panel and having a second refractive index greater than the refractive index of the base portion, the second part having side surfaces contacting the base portion,
    wherein a vertical distance between the first surface and the display panel is less than a vertical distance between the second surface and the display panel,
    wherein a width of the recess is gradually decreased toward the direction of the second surface of the base portion, and a distance between the second part and the display panel is less than a distance between the first part and the display panel,
    wherein light discharged from the lower direction of the display filter is incident on the side surfaces of the first and second parts,
    wherein the light incident on the side surfaces of the first part is reflected by the side surfaces of the first part and then discharged to the second surface of the base portion, and the light incident on the side surfaces of the second part is absorbed by the side surfaces of the second part, and
    wherein a height of the side surfaces of the second part is 0.05 times greater and 0.45 times less than a height of the side surfaces of the first part.

11. The display device of claim 10, wherein the first part is disposed in contact with the second part in the recess.

12. The display device of claim 10, wherein the first refractive index is 0.82 times greater and 0.99 times less than the refractive index of the base portion.

13. The display device of claim 10, wherein the refractive index of the base portion is 0.82 times greater and approximately 0.99 times less than the second refractive index.

14. The display device of claim 10, wherein a degree of blackness of the first part is less than a degree of blackness of the second part.

15. The display device of claim 10, wherein a width of the first part is less than a width of the second part.

16. The display device of claim 10, wherein the first and second parts form a matrix or wavy configuration.

17. A method for forming a display filter disposed on a front surface of a display panel, the method comprising:
   forming a base portion including a first surface facing the front surface of the display panel and a second surface opposing the first surface, wherein a recess is formed on the first surface;
   forming a first part disposed in the recess, the first part having a first refractive index less than a refractive index of the base portion and having side surfaces contacting the base portion; and
   forming a second part disposed in the recess, the second part having a second refractive index greater than the refractive index of the base portion, the second part having side surfaces contacting the base portion,
   wherein a vertical distance between the first surface and the display panel is less than a vertical distance between the second surface and the display panel,
   wherein a width of the recess is gradually decreased toward the direction of the second surface of the base portion, and a distance between the second part and the display panel is less than a distance between the first part and the display panel,
   wherein light discharged from the lower direction of the display filter is incident on the side surfaces of the first or second parts,
   wherein the light incident on the side surfaces of the first part is reflected by the side surfaces of the first part and then discharged to the second surface of the base portion, and the light incident on the side surfaces of the second part is absorbed by the side surfaces of the second part, and
   wherein a height of the side surfaces of the second part is 0.05 times greater and 0.45 times less than a height of the side surfaces of the first part.

18. The method of claim 17, wherein the step of forming the first part includes:
   forming first resin having carbon particles on the first surface of the base portion; and
   scraping the first surface of the base portion having the first resin therein so as to form the first part in the recess of the base portion.

19. The method of claim 18, wherein the step of forming the second part includes:
   forming a second resin having carbon particles on the first surface of the base portion having the first part; and
   scraping the first surface of the base portion having the second resin so as to form the second part on the first part in the recess of the base portion.

* * * * *